Figure 1:
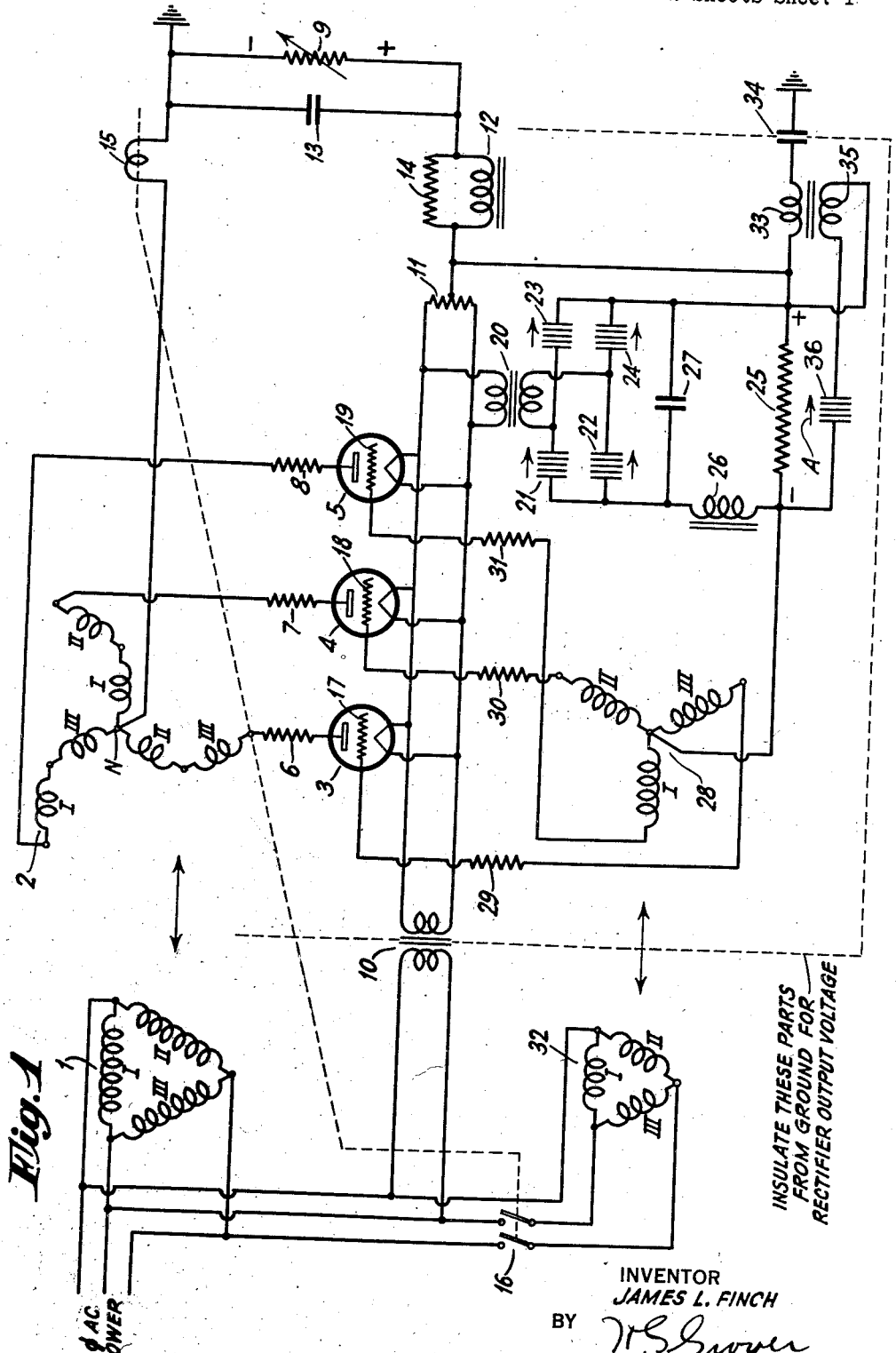

Jan. 9, 1940.   J. L. FINCH   2,186,239
RECTIFIER SYSTEM
Filed May 11, 1937   2 Sheets-Sheet 1

INVENTOR
JAMES L. FINCH
BY
ATTORNEY

Jan. 9, 1940.　　　　J. L. FINCH　　　2,186,239
RECTIFIER SYSTEM
Filed May 11, 1937　　　2 Sheets-Sheet 2
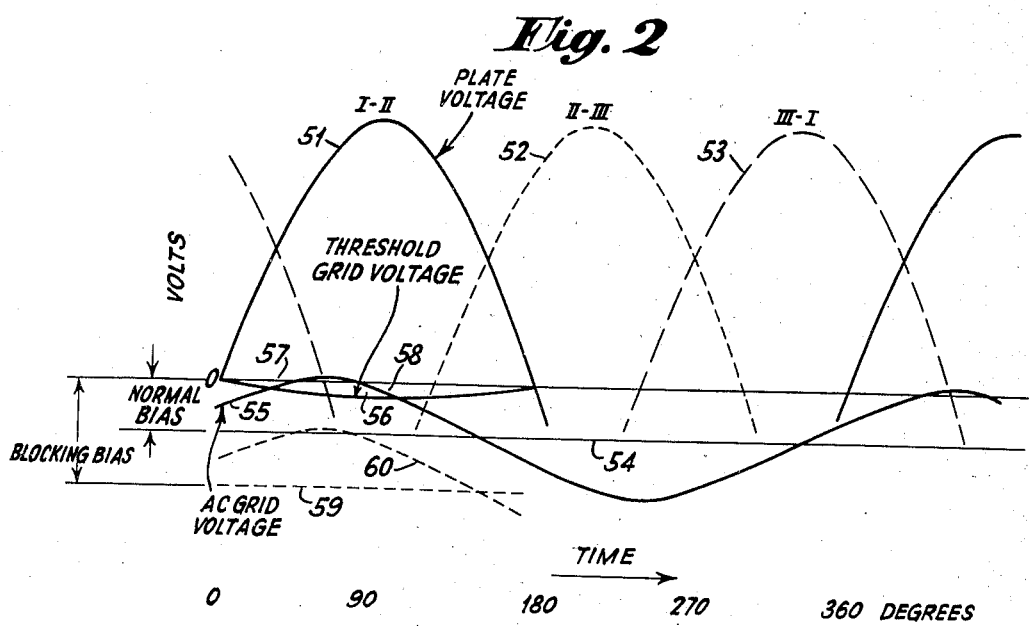
INVENTOR
JAMES L. FINCH
BY
ATTORNEY Patented Jan. 9, 1940

2,186,239

UNITED STATES PATENT OFFICE 2,186,239

RECTIFIER SYSTEM

James L. Finch, Patchogue, N. Y., assignor to Radio Corporation of America, a corporation of Delaware Application May 11, 1937, Serial No. 142,059

12 Claims. (Cl. 175—363)

My invention relates to a rectifier which uses gas filled thermionic triodes commonly known as "grid glow tubes" and as "thyratrons." My invention relates particularly to means for preventing the passage of current through these triodes under particular conditions. These particular conditions are (a) when the rectifier is subjected to an overload such as occurs when its output is short circuited, and (b) when one of the triodes has broken down so as to conduct currents in the wrong direction, this condition being known as an arc-back. My invention relates particularly to means for accomplishing the above in a simple and inexpensive manner.

The circuit diagram of one embodiment of my invention is shown in Figure 1. Figure 2 is explanatory of the operation of Figure 1.

In Figure 1, I is the primary of the rectifier transformer and 2 the secondary. It will be noted that I employ a delta connected primary with the three phases marked I, II and III for purposes of indicating phase relationships. It will also be noted that I employ a standard Y-zig-zag secondary. This involves the use of windings from two separate phases in series to form each leg of the Y. The purpose of this is to balance out the direct current flux which would otherwise appear in the iron of the transformer. I have identified the windings in the secondary by I, II and III and have drawn them in the relative positions that the voltage vectors would occupy in a vector diagram.

The plates of rectifier tubes 3, 4 and 5 are connected to the transformer secondary through current limiting resistors 6, 7 and 8. The load circuit 9 of the rectifier is connected between the neutral N of the transformer secondary and the rectifier tube filament circuit at 11. The filaments are heated from filament transformer 10. Resistor 11 is used for obtaining a mid-tap for the output connection from the filament circuit. The output of the rectifier is filtered for the purpose of suppressing the A. C. components by means of series reactor 12 and condenser 13. The reactor 12 is shunted by resistor 14 so that the output load current can be varied at a higher rate than would otherwise be possible.

I have placed an overload relay with its actuating coil 15 in the connection between the neutral of the transformer secondary and the load. The contacts 16 of this overload relay are placed in another part of the circuit described later.

It will be noted that the rectifier tubes are equipped with grids 17, 18 and 19. It is these grids that make these tubes grid glow tubes instead of plain rectifier tubes. These tubes have the characteristic that when a relatively low negative voltage with respect to the cathode is impressed on these grids they will not conduct current in either direction when the plate voltage is within the normal voltage rating. I have provided a bias rectifier for maintaining these grids at a negative potential. This bias rectifier obtains its plate power from the transformer 20 connected to the cathode heating circuit of the main rectifier. The bias rectifier plate power is obtained from this source rather than from the power lines directly so as to avoid the necessity of providing a transformer insulated between primary and secondary for the output voltage of the main rectifier. This bias rectifier uses plate transformer 20 and four copper oxide disc rectifier units 21, 22, 23 and 24 connected in a full single phase circuit. This bias rectifier impresses its rectified voltage across resistance 25. A filter for suppressing the A. C. components of the rectifier output is provided in the form of series reactor 26 and shunt condenser 27. The positive end of resistor 25 is connected to the main rectifier cathode circuit and the negative end is connected indirectly to the three grids.

Interposed between the negative end of resistor 25 and the grids are the three windings of the secondary of transformer 28 and grid current limiting resistors 29, 30 and 31. The primary 32 of the above transformer is connected to the same three phase A. C. power source as is the primary of the main transformer. It is connected through the contacts 16 of the overload relay so that when this overload relay opens it will remove the voltage from this transformer. It will be noted that only two of the three connecting wires are opened. This leaves the primary connected to the A. C. power source so that any direct current leakage from the secondary to the primary will be carried off to ground. The various windings of transformer 32—28 are drawn in a manner to indicate the vector relationship of their voltages.

The main rectifier cathode circuit is connected to ground through transformer primary 33 and condenser 34. The secondary 35 of this transformer is connected between the cathode circuit of the main rectifier which is also the positive terminal of the bias rectifier, through copper oxide rectifier 36 to the negative output terminal of the bias rectifier. This copper oxide rectifier is connected so that the current flows more freely in the direction indicated by the arrow A.

In the operation of this invention the bias rectifier 21—24 generates sufficient voltage to block the main rectifier tubes by means of their grids. This bias is overcome by the A. C. voltages generated in the windings of transformer 28 secondary during the time intervals when it is necessary for these rectifier tubes to pass current. In case of an overload which will open the overload relay contacts 16, this A. C. voltage is removed from the main rectifier tube grids and the bias voltage prevents them from passing current until contacts 16 are closed again.

In practice a certain time interval will be required after the overload has occurred before contacts 16 can open. In order to get quicker action the circuits comprising elements 33, 34, 35 and 36 are added. Condenser 34 becomes charged up to the full voltage of the rectifier output. In case of a short circuit in the load condenser 34 will discharge to that short circuit through transformer primary 33. This transient effect sets up a voltage in winding 35 which is impressed on the grids of the main rectifier tubes. This voltage is sufficient to block these tubes even with the A. C. voltage being supplied by windings 28. Thus, very quick action is obtained.

A similar action results when one of the rectifier tubes arcs back, i. e. conducts in the wrong direction. This transient action prevents the tubes from firing until the relay contacts 16 have had time to open. Rectifier 36 is used to prevent an undesired action which would otherwise occur when initially putting this rectifier in operation. During this transient condition condenser 34 is charged. This would tend to decrease the bias voltage if it were not for the action of rectifier 36.

Figure 2 shows the phase relationships encountered in this device. This figure comprises a graphical representation of the voltages plotted against time. 51 is the voltage generated in the secondary 2 of the main transformer in phases I—II which is impressed on the plate of tube 4. 52 and 53 represent the voltages impressed on the other two tubes. 54 represents the bias voltage which is normally maintained on the grids, and 55 represents the A. C. voltage normally impressed on grid 18 of tube 4. It will be noted that the phase of this A. C. voltage leads the phase of that impressed on the plate of tube 4 by 30°. 56 represents the negative voltage which must be impressed on the grid of tube 4 in order to prevent it from conducting when the voltages represented by 51 are impressed on its plate. It will be noted that lines 55 and 56 cross at point 57. Thus, at this time in the cycle tube 4 will be allowed to conduct. This is the point at which this tube would normally start to conduct in a rectifier which does not use grid control. The nature of these gas filled tubes is such that after they have started conducting they will continue to conduct until their plate voltage drops to zero. Accordingly, no harm is experienced when curves 55 and 56 again cross at point 58. In actual practice, when the rectifier is operating normally the positive voltage between the plates and cathodes of the tubes never exceeds a very small value. Accordingly, the A. C. grid voltage must be somewhat higher than that shown in curve 55.

It will be noted that when the A. C. grid voltage is removed the grids are maintained by the bias rectifier at a sufficiently negative potential to prevent the tubes from conducting. This is the condition when contacts 16 are open.

When some abnormal condition exists such as a short circuit in the load or an arc-back in one of the tubes and condenser 34 is discharging the bias voltage is increased to a value indicated by curve 59 which brings the total grid voltage to a value represented by curve 60. It will be noted that this curve does not cross curve 56 so that the tube will be prevented from conducting.

I have illustrated the action in connection with tube 4, but have not given separate diagrams for the other tubes since the action in connection with the other two tubes 3 and 5 is identical.

In case the short circuit condition assumed above should reduce the A. C. power line voltage to a low value the bias voltage will not be reduced immediately on account of the energy storage in condenser 27. This condenser will be of a sufficient size to keep this bias voltage normal until contacts 16 have had time to open.

Modifications of the above described circuits will be obvious. For example, while I have shown three phase transformers 1—2 and 32—28 each of these could be made up of three single phase transformers. Condenser 34 may be eliminated and transformer primary 33 may be placed in series with condenser 13.

Also, I have illustrated this invention in connection with a three phase half wave rectifier. It can also be used in connection with any other types of rectifier, such as full wave rectifiers. In some cases, it may be desirable to have a different phase angle between the A. C. grid voltage and the plate voltage than that which I have shown. This can be accomplished by any of the well known means for obtaining various phase relationships in polyphase circuits.

Having thus described my invention, what I claim is:

1. A rectifier system comprising a plurality of rectifier tubes each having an anode, a cathode and a grid, a filament circuit for heating said cathodes, a source of blocking voltage comprising a rectifier energized from said filament circuit, means for applying voltage from said source to the grids of said tubes for rendering them nonconductive, a source of alternating voltage to be rectified connected to the plates of said tubes, a direct current load circuit and means adapted to nullify the blocking voltage on said grids, said last mentioned means being operative upon existence of predetermined phase and polarity of the voltage applied to the plates of said rectifier tubes.

2. A rectifier system comprising a plurality of rectifier tubes, each having an anode, a cathode and grid, a filament circuit for heating said cathodes, a source of blocking voltage, said source comprising a rectifier energized from said filament circuit, means for applying said voltage from said source to the grids of said tubes for rendering them nonconductive, a source of alternating voltage to be rectified connected to the plates of said tubes, a direct current load circuit and means including a transformer to nullify the blocking voltage on said grids, said last mentioned means being operative upon existence of predetermined phase and polarity of the voltage applied to the plates of said rectifier tubes, and means for opening said transformer circuit in the event of an overload in said load circuit.

3. A rectifier system comprising a plurality of rectifier tubes, each having an anode, a cathode and a grid, a source of blocking voltage, means for applying voltage from said source to the grids of said tubes for rendering them non-conductive, a source of alternating voltage to be rectified connected to the plates of said tubes, a direct current load circuit and means including a transformer adapted to nullify the blocking voltage on said grids, said last mentioned means being operative upon existence of predetermined phase and polarity of the voltage applied to the plates of said rectifier tubes, a condenser across said load circuit, means responsive to a disturbance in said load circuit for applying the charge in said condenser as an additional blocking voltage to the grids of said tubes.

4. A rectifier system comprising a plurality of rectifier tubes, each having an anode, a cathode and a grid, a filament circuit for heating said cathodes, a source of blocking voltage, said source comprising a rectifier energized from said filament circuit, means for applying voltage from said source to the grids of said tubes for rendering them non-conductive, a source of alternating voltage to be rectified connected to the plates of said tubes, a direct current load circuit and means adapted to nullify the blocking voltage on said grids, said last mentioned means being operative upon existence of predetermined phase and polarity of the voltage applied to the plates of said rectifier tubes, a condenser across said load circuit, means responsive to a disturbance in said load circuit for simultaneously applying the charge in said condenser as an additional blocking voltage to each of the grids of said tubes.

5. In combination a rectifier tube having a cathode, a grid and an anode, means for applying an alternating voltage to be rectified to the anode of said tube, a direct current load circuit connected to the cathode of said tube, a source of blocking bias voltage connected between the grid and cathode of said tube, a transformer coupled to the grid and the cathode of said tube for periodically overcoming the blocking bias on said tube, a second transformer having a primary and a secondary, said primary and a condenser being connected in series across said load circuit, the secondary of said second transformer being connected to said source of blocking voltage so that the discharge of said condenser caused by a disturbance in said load circuit momentarily increases the blocking voltage on said grids.

6. In combination a rectifier tube having a cathode, a grid and an anode, means for applying an alternating voltage to be rectified to the anode of said tube, a direct current load circuit connected to the cathode of said tube, a source of blocking bias voltage connected between the grid and cathode of said tube, a transformer coupled to the grid and the cathode of said tube for periodically overcoming the blocking bias on said tube, a second transformer having a primary and a secondary, said primary and a condenser being connected in series across said load circuit, the secondary of said second transformer being connected to said source of blocking voltage so that the discharge of said condenser caused by a disturbance in said load circuit momentarily increases the blocking voltage on said grids, and means for disconnecting said first transformer while said increased blocking voltage is effective.

7. In combination a rectifier tube having a cathode, a grid and an anode, means for applying an alternating voltage to be rectified to the anode of said tube, a direct current load circuit connected to the cathode of said tube, a source of blocking bias voltage connected between the grid and cathode of said tube for periodically overcoming the blocking bias on said tube, a second transformer having a primary and a secondary, said primary and a condenser being connected in series across said load circuit, the secondary of said second transformer being connected to said source of blocking voltage so that the discharge of said condenser caused by a disturbance in said load circuit momentarily increases the blocking voltage on said grids, and means for disconnecting said first transformer while said increased blocking voltage is effective comprising a relay having its winding in said load circuit.

8. In combination a rectifier tube having a cathode, a grid and an anode, means for applying an alternating voltage to be rectified to the anode of said tube, a direct current load circuit connected to the cathode of said tube, a source of blocking bias voltage connected between the grid and cathode of said tube, a transformer coupled in series therewith for periodically overcoming the blocking bias on said tube, a second transformer having a primary and a secondary, said primary and a condenser being connected in series across said load circuit, the secondary of said second transformer being connected to said source of blocking voltage so that the discharge of said condenser caused by a disturbance in said load circuit momentarily increases the blocking voltage on said grids, and a rectifier in series with the secondary of said second transformer whereby impulses generated by the charge of said condenser are blocked from said grids.

9. In combination a rectifier tube having a cathode, a grid and an anode, means for applying an alternating voltage to be rectified to the anode of said tube, a direct current load circuit connected to the cathode of said tube, a source of blocking bias voltage connected between the grid and cathode of said tube, a transformer coupled in series therewith for periodically overcoming the blocking bias on said tube, a second transformer having a primary and a secondary, said primary and a condenser being connected in series across said load circuit, the secondary of said second transformer being connected to said source of blocking voltage so that the discharge of said condenser caused by a disturbance in said load circuit momentarily increases the blocking voltage on said grids, a rectifier in series with the secondary of said transformer whereby impulses generated by the charge of said condenser are blocked from said grids, and means for disconnecting said first transformer while said increased blocking voltage is effective.

10. In combination a rectifier tube having a cathode, a grid and an anode, means for applying an alternating voltage to be rectified to the anode of said tube, a direct current load circuit connected to the cathode of said tube, a source of blocking bias voltage connected between the grid and cathode of said tube, a transformer coupled in series therewith for periodically overcoming the blocking bias on said tube, a second transformer having a primary and a secondary, said primary and a condenser being connected in series across said load circuit, the secondary of said second transformer being connected to said source of blocking voltage so that the discharge of said condenser caused by a disturbance in said load circuit momentarily increases the blocking voltage on said grids, a rectifier in series with the secondary of said second transformer whereby impulses generated by the charge of said condenser are blocked from said grids, and means for disconnecting said first transformer while said increased blocking voltage is effective, comprising a relay having a winding in said load circuit.

11. The method of operating gas-filled thermionic triodes as a rectifier which includes impressing upon the grids of the triodes a negative bias voltage sufficient to block current flow therethrough, superimposing on the grids A. C. voltages of the correct phase relationship and amplitude to permit current passage at predetermined times, storing a charge due to the direct current output voltage and in the event of a disturbance in said output circuit applying the stored energy to the grids of said triodes in an additive relation to said negative bias voltage to momentarily increase the negative bias voltage thereon sufficient to overcome superimposed alternating voltages.

12. The method of operating gas-filled thermionic triodes as a rectifier which includes impressing upon the grids of the triodes a negative bias voltage sufficient to block current flow therethrough, superimposing on the grids A. C. voltages of the correct phase relationship and amplitude to permit current passage at predetermined times, storing a charge due to the direct current output voltage and in the event of a disturbance in said output circuit applying the stored energy to the grids of said triodes in an additive relation to said negative bias voltage to momentarily increase the negative bias voltage thereon sufficient to overcome superimposed alternating voltages and thereafter removing the alternating current voltages superimposed on the grids whereby operation of the rectifier is suspended.

JAMES L. FINCH.